United States Patent
Stegemoeller et al.

(10) Patent No.: US 7,931,088 B2
(45) Date of Patent: Apr. 26, 2011

(54) METHODS FOR TREATING A WELL BY SIMULTANEOUSLY INTRODUCING INTO A MIXER STREAMS OF WATER, A VISCOSITY-INCREASING AGENT, AND A PARTICULATE AND INTRODUCING THE MIXTURE INTO THE WELL

(75) Inventors: Calvin L. Stegemoeller, Duncan, OK (US); Max L. Phillippi, Duncan, OK (US); Billy Slabaugh, Wichita Falls, TX (US); Tommy Slabaugh, legal representative, Wichita Falls, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 85 days.

(21) Appl. No.: 12/322,162

(22) Filed: Jan. 29, 2009

(65) Prior Publication Data

US 2010/0186959 A1 Jul. 29, 2010

(51) Int. Cl.
*E21B 43/25* (2006.01)
*E21B 43/26* (2006.01)
*E21B 43/267* (2006.01)

(52) U.S. Cl. ............ 166/308.1; 166/90.1; 166/177.5; 166/308.2; 366/164.1; 366/164.6; 507/904

(58) Field of Classification Search ................ None
See application file for complete search history.

(56) References Cited

U.S. PATENT DOCUMENTS

| | | | | |
|---|---|---|---|---|
| 5,190,374 A | * | 3/1993 | Harms et al. | 366/165.2 |
| 7,048,432 B2 | * | 5/2006 | Phillippi et al. | 366/164.1 |
| 7,104,328 B2 | * | 9/2006 | Phillippi et al. | 166/308.5 |
| 7,401,973 B1 | * | 7/2008 | Lott | 366/163.2 |
| 2004/0218464 A1 | * | 11/2004 | Arribau et al. | 366/164.6 |
| 2006/0028914 A1 | * | 2/2006 | Phillippi et al. | 366/279 |

* cited by examiner

*Primary Examiner* — George Suchfield
(74) *Attorney, Agent, or Firm* — Robert A. Kent; Booth Albanesi Schroeder LLC

(57) ABSTRACT

A method is provided for treating at least a portion of a well. The method includes the steps of: (a) simultaneously introducing into a mixer at least: (i) a first stream comprising water; (ii) a second stream comprising a dry, hydratable, viscosity-increasing agent for water, wherein the second stream is substantially free of water; and (iii) a third stream comprising a non-hydratable, insoluble particulate; wherein at least the first and second streams are not mixed prior to being introduced into the mixer; (b) mixing the first, second, and third streams in the mixer to form a pumpable mixture, wherein: (i) the mixer creates at least a sufficiently-high shear rate to disperse the viscosity-increasing agent and the insoluble particulate in the pumpable mixture; and (ii) the pumpable mixture has or is capable of developing a substantially-higher viscosity than the viscosity of the first stream; and (c) introducing a treatment fluid comprising the pumpable mixture into a wellbore.

21 Claims, 5 Drawing Sheets

METHODS FOR TREATING A WELL BY SIMULTANEOUSLY INTRODUCING INTO A MIXER STREAMS OF WATER, A VISCOSITY-INCREASING AGENT, AND A PARTICULATE AND INTRODUCING THE MIXTURE INTO THE WELL

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

SUMMARY

A method is provided for treating at least a portion of a well. In general, the method includes the steps of: (a) simultaneously introducing into a mixer at least: (i) a first stream comprising water; (ii) a second stream comprising a dry, hydratable, viscosity-increasing agent for water, wherein the second stream is substantially free of water; and (iii) a third stream comprising a non-hydratable, insoluble particulate; (b) mixing the first, second, and third streams in the mixer to form a pumpable mixture, wherein: (i) the mixer creates at least a sufficiently-high shear rate to disperse the viscosity-increasing agent and the insoluble particulate in the pumpable mixture; and (ii) the pumpable mixture has or is capable of developing a substantially-higher viscosity than the viscosity of the first stream; and (c) introducing a treatment fluid comprising the pumpable mixture into a wellbore.

These and other features and advantages of the present inventions will be more readily appreciated when considered in conjunction with the accompanying drawing in which an embodiment of the method is illustrated.

BRIEF DESCRIPTION OF THE DRAWING

The accompanying drawing is incorporated into and forms a part of the specification to illustrate examples according to the presently most-preferred embodiments of the present inventions. The drawing is only for illustrating a preferred and alternative example of the inventions and is not to be construed as limiting the inventions to only the illustrated and described example. The drawing includes the following figures.

DETAILED DESCRIPTION OF THE INVENTION

Figure 1:
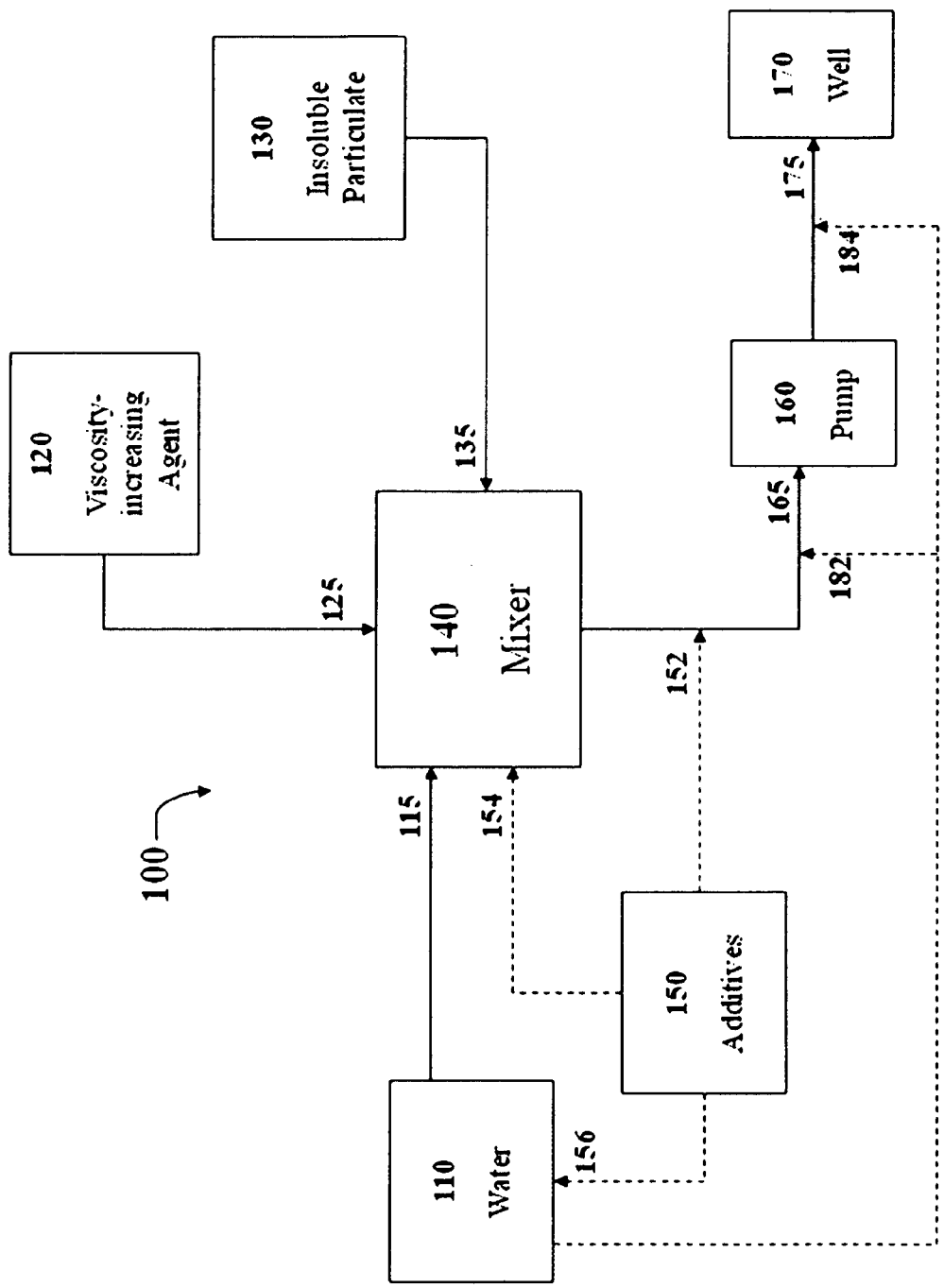
FIG. 1 is a diagram of a method according to the inventions for treating a well, wherein three separate streams of water, viscosity-increasing agent, and insoluble particulate are simultaneously introduced into a mixer to form a pumpable mixture, which is directed to a well.

Oil and gas hydrocarbons are naturally occurring in some subterranean formations. A subterranean formation containing oil or gas is sometimes referred to as a reservoir. As used herein, a "well" includes at least one wellbore drilled into the earth to try to reach an oil or gas reservoir and produce oil or gas from the reservoir. As used herein, the term "wellbore" refers to the wellbore itself, including any uncased, openhole portion of the wellbore. Further, as used herein, "into a wellbore" means and includes directly into and through the wellbore or into and through a casing, liner, or other tubular within the wellbore. The near-wellbore region is the subterranean material and rock of the subterranean formation surrounding the wellbore. As used herein, a "well" also includes the near-wellbore region.

It is often desirable to treat at least a portion of well or subterranean formation with various types of treatment fluids in the effort to produce oil or gas from a reservoir. A treatment is designed to resolve a specific wellbore or reservoir condition. For example, stimulation is a treatment performed on a well to restore or enhance the productivity of the well. Stimulation treatments fall into two main groups, hydraulic fracturing and matrix treatments. Fracturing treatments are performed above the fracture pressure of the reservoir formation and create a highly-conductive flow path between the reservoir and the wellbore.

As used herein, a "fluid" is an amorphous substance having a continuous phase that tends to flow and to conform to the outline of its container (like a liquid or a gas) when tested at a temperature of 77° F. and a pressure of 1 atmosphere. As used herein, a "fluid" can have more than one distinct phase. For example, a "fluid" can be or include a slurry, which is a suspension of solid particles (such as sand) in a continuous liquid phase; it can be or include an emulsion, which is a suspension of two or more immiscible liquids where droplets of at least one liquid phase are dispersed in a continuous liquid phase of another; or it can be or include a foam, which is a suspension or dispersion of gas bubbles in a continuous liquid phase. Further, as used herein, a "fluid" should be pumpable.

As used herein, a "treatment fluid" is a fluid designed and prepared to resolve a specific wellbore or reservoir condition. The treatment fluid can be for any of a wide variety of downhole purposes in a well, such as stimulation, isolation, or control of reservoir gas or water. The term "treatment" in the term "treatment fluid" does not necessarily imply any particular action by the fluid.

"Hydraulic fracturing," sometimes simply referred to as "fracturing," is a common stimulation treatment. A treatment fluid for this purpose is sometimes referred to as a "fracturing fluid." The fracturing fluid is pumped at a high flow rate and high pressure down into the wellbore and out into the formation. The pumping of the fracturing fluid is at a high flow rate and pressure that is much faster and higher than the fluid can escape through the permeability of the formation. Thus, the high flow rate and pressure create or enhance a fracture in the subterranean formation. Creating a fracture means making a new fracture in the formation. Enhancing a fracture means enlarging a pre-existing fracture in the formation.

For pumping in hydraulic fracturing, a "frac pump" is used, which is a high-pressure, high-volume pump. Typically, a frac pump is a positive-displacement reciprocating pump. These pumps generally are capable of pumping a wide range of fluid types, including corrosive fluids, abrasive fluids and slurries containing relatively-large particulates, such as sand. Using one or more frac pumps, the fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, pressures in excess of 10,000 psi are not uncommon.

To fracture a subterranean formation typically requires hundreds of thousands of gallons of fracturing fluid. Further, it is often desirable to fracture at more than one downhole location. For various reasons, including the high volumes of fracturing fluid required, ready availability, and historically low cost, the fracturing fluid is usually water or water based. Thus, fracturing a well may require millions of gallons of water.

When the formation fractures or an existing fracture is enhanced, the fracturing fluid suddenly has a fluid flow path through the crack to flow more rapidly away from the wellbore. As soon as the fracture is created or enhanced, the sudden increase in flow of fluid away from the well reduces the pressure in the well. Thus, the creation or enhancement of a fracture in the formation is indicated by a sudden drop in fluid pressure, which can be observed at the well head.

After it is created, the newly-created fracture will tend to close after the pumping of the fracturing fluid is stopped. To prevent the fracture from closing, a material must be placed in the fracture to keep the fracture propped open. This material is usually in the form of an insoluble particulate, which can be suspended in the fracturing fluid, carried downhole, and deposited in the fracture. The particulate material holds the fracture open while still allowing fluid flow through the permeability of the particulate. A particulate material used for this purpose is often referred to as a "proppant." When deposited in the fracture, the proppant forms a "proppant pack," and, while holding the fracture apart, provides conductive channels through which fluids can flow to the wellbore. For this purpose, the particulate is typically selected based on two characteristics: size range and strength.

When used as a proppant, the particulate must have an appropriate size to prop open the fracture and allow fluid to flow through the particulate pack, i.e., in between and around the particles making up the pack. Appropriate sizes of particulate for use as a proppant are typically in the range from about 8 to about 100 U.S. Standard Mesh. A typical proppant is sand, which geologically is defined as having a particle size ranging in diameter from about 0.0625 millimeters (¹⁄₁₆ mm) up to about 2 millimeters. The next smaller size class in geology is silt, particles smaller than 0.0625 mm down to 0.004 mm in diameter. The next larger size class in geology is gravel, with particles ranging from greater than 2 mm up to 64 mm. As used herein, this geological definition of gravel size class will not apply to a slurry to be pumped downhole, as such particles are so large they would plug up pumps. More particularly in the oil and gas field and as used herein, the term "gravel" is sometimes used to refer to relatively-large particles in the sand size classification, that is, particles ranging in diameter from about 0.5 mm up to about 2 mm.

The particulate material of a proppant must have sufficient strength to prop a fracture open and to allow fluid flow through a pack of the particulate material in the fracture. One example of such a material is MONOPROP®, commercially available from Halliburton Energy Services in Duncan, Okla. By way of another example, for a proppant material that crushes under closure stress, the proppant preferably has an API crush strength of at least 2,000 psi closure stress based on 10% crush fines. If the insoluble particulate is for gravel packing, its compressive strength or crush resistance is less critical.

As used herein, "insoluble particulate" means and refers to a particulate material that is suitable for use as a proppant pack or gravel pack, including without limitation, sand, synthetic materials, manufactured materials, and any combinations thereof. For this purpose, "insoluble particulate" does not mean or refer to suspended solids, silt, fines, or other types of particulate smaller than 0.0625 mm. Further, it does not mean or refer to particulate larger than 2 mm. Of course, "insoluble particulate" also does not mean or refer to dissolved solids. The fracture, especially if propped open by a proppant pack, provides an additional flow path for the oil or gas to reach the wellbore, which increases oil and gas production from the well.

Suitable proppant materials include, but are not limited to, sand (silica), walnut shells, sintered bauxite, glass beads, plastics, nylons, resins, other synthetic materials, and ceramic materials. Mixtures of proppants can be used as well. If sand is used, typically will be from about 20 to about 100 U.S. Standard Mesh in size. With synthetic proppants, mesh sizes about 8-100 are typically used. The concentration of proppant in the fluid can be any concentration known in the art, and preferably will be in the range of from about 0.01 kilograms to about 3 kilograms of proppant added per liter of liquid phase (about 0.1-25 lb/gal). Also, any of the proppant particles can be coated with a resin or flow-back aid potentially to improve the strength, clustering ability, and flow-back properties of the proppant.

It should be understood that a treatment, such as fracturing, may involve several stages of treatment fluids during the course of the treatment. Variations in the compositions of the treatment fluids involved may need to be made, for example, to accommodate changes in the concentration of proppant to be carried down to the subterranean formation during treatment stages. Variations in the compositions may need to be made to accommodate expected changes in temperature over the course of the treatment. Further, variations in the compositions can be made to accommodate the longer duration that a first-stage treatment fluid may need to maintain viscosity before breaking compared to the shorter duration that a later-stage portion of a treatment fluid may need to maintain viscosity over the course of injecting large quantities of treatment fluid into a wellbore. These changes in the compositions can be made in stepped changes of concentrations or ramped changes of concentrations. Further, certain components of the treatment fluids may be changed, for example, a catalyst for a breaker can be changed from the beginning to the end as another mechanism to control the different break times required from a first-stage treatment fluid compared to a later-stage treatment fluid. Further, for example, treatment fluids for a fracturing operation can have a ramped-up concentration of proppant or have a higher "tail-end" concentration of a particulate (such as a proppant).

A treatment fluid is commonly water based due to the relatively low cost and ready availability of water compared to other fluids. As used herein, "water based" means comprising water as the continuous phase of the treatment fluid. It should be understood, of course, that a fluid can include a gas for foaming the fluid. Most commonly, a treatment fluid is water based.

The proppant material typically has a much higher specific gravity than deionized water measured at 25° C. (77° F.) and 1 atmosphere pressure. For example, sand has a specific gravity of about 2.7. Such a proppant suspended in water will tend to separate quickly and settle out from the water very rapidly. To help suspend the proppant (or other particulate with a substantially different density than water) in a water-based fracturing fluid, it is common to use a viscosity-increasing agent for the purpose of increasing the viscosity of water. For example, a particulate having a specific gravity in the range of from about 0.9 to about 3.5 may be suitable for use in particular applications of the present inventions.

Viscosity is the resistance of a fluid or slurry to flow, defined as the ratio of shear stress to shear rate. The unit of viscosity is Poise, equivalent to dyne-sec/$cm^2$. Because one poise represents a relatively-high viscosity, 1/100 poise, or one centipoise ("cP"), is usually used with regard to well treatment fluids. Viscosity must have a stated or an understood shear rate in order to be meaningful. Measurement temperature also must be stated or understood. As used herein, if not otherwise specifically stated, viscosity is measured with a Model 50 type viscometer at a shear rate of 40 l/s and at 25° C. (77° F.).

The viscosity of pure water is about 1 cP. A viscosity-increasing agent is a chemical additive that alters fluid rheological properties to increase the viscosity of a fluid. A viscosity-increasing agent can be used to increase the viscosity, which increased viscosity can be used, for example, to help suspend a proppant material in the treatment fluid. As used herein, a "base fluid" is a fluid that does not include a viscosity-increasing agent. A typical base fluid is water based. As used herein, "base gel" is a fluid that includes a viscosity-increasing agent, such as guar, but that excludes, for example, fluids that are typically referred to as "cross-linked gels" and "surfactant gels."

Because of the high volume of fracturing fluid used in fracturing, it is desirable to increase the viscosity of fracturing fluids efficiently in proportion to the concentration of the viscosity-increasing agent. Being able to use only a small concentration of the viscosity-increasing agent requires less total amount to achieve the desired fluid viscosity in a large volume of fracturing fluid. Efficient and inexpensive viscosity-increasing agents include water-soluble polymers such as guar gum. Other types of viscosity-increasing agents can also be used for various reasons, for example, in high-temperature applications.

The viscosity of solutions with viscosity-increasing agents can be greatly enhanced by cross linking the viscosity-increasing agent with a cross-linking agent. For example, guar gum and similar viscosity-increasing agents can be cross linked with boric acid or other boron-containing materials, antimony, zirconium titanium and the like. Thus, boron cross-linked guar gum solutions are commonly used as fracturing fluids. Of course, there are numerous other types of cross-linking agents. Cross linking may be undesirable for certain types of well treatments, however, such as water-frac treatments. Further, the presence of a substantial concentration of boron in the water, either naturally occurring or in produced water, may cause undesirable cross linking.

Optionally, one or more other additives can be included to form a treatment fluid to be delivered into a wellbore for various purposes, for example, to stimulate the formation. Such additives are typically introduced or mixed into the fluid at a point after hydration of the hydratable additive begins. Normally, there is a time of several minutes before the treatment fluid pumped into the wellbore reaches the formation.

Treatment fluids used in the inventions commonly include a breaker. A breaker is a chemical used for the purpose of diminishing or "breaking" the viscosity of the fluid so that this fluid can be recovered more easily from the formation during cleanup. With regard to breaking down viscosity, oxidizers, enzymes, or acids can be used, including delayed-release or encapsulated breakers. Breakers reduce the polymer's molecular weight by the action of an acid, an oxidizer, an enzyme, or some combination of these on the polymer itself. In the case of borate cross-linked gels, increasing the pH, and, therefore, increasing the effective concentration of the active cross linker, the borate anion, reversibly creates the borate cross links. Lowering the pH can eliminate the borate/polymer bonds. At a high pH above 8, the borate ion exists and is available to cross link and cause gelling. At a lower pH, the borate converts back to boric acid and is not available for cross linking, thus, increases in viscosity due to cross linking by borate ion is reversible.

Some fluids used in the inventions can also include a surfactant. For example, a surfactant may be used for its ability to aid the dispersion and/or stabilization of a gas component into the fluid. Viscoelastic surfactants are also suitable for use in the treatment fluids.

A fiber component can be included in the fluids used in the inventions to achieve a variety of properties including improving particle suspension, particle transport capabilities, and gas phase stability. Fibers used may be hydrophilic or hydrophobic in nature, but hydrophilic fibers are preferred. Fibers can be any fibrous material. Preferably, the fibers are insoluble in the treatment fluid.

Treatment fluids used in the inventions can further contain other additives and chemicals that are known to be commonly used in oil field applications by those skilled in the art. These include, but are not necessarily limited to, breaker aids, co-surfactants, oxygen scavengers, alcohols, scale inhibitors, corrosion inhibitors, fluid-loss additives, oxidizers, bactericides, biocides, microemulsions, and the like.

The vast majority of oil and gas wells in the U.S. and a large number of international wells are stimulated by hydraulic fracturing. A great deal of study and effort goes into the development and production of fluids that are suitable to withstand the temperatures and duration of fracturing treatments for subterranean formations. The fracturing fluid must generate fracture geometry and carry propping agents into the fracture.

One of the most important properties of fracturing fluids is the viscosity that is produced at a specific temperature at a specific time during the pumping operation. The viscosity measurement can be used as an indicator of the capacity of a fluid to suspend and transport a particulate, such as a proppant for fracturing or a gravel for gravel packing. There are numerous ways of measuring and modeling viscous properties, and new developments continue to be made. A typical method for QA/QC purposes uses a couette device that measures viscosity as a function of time and temperature. Test fluids contain all of the components of the fluid including water, polymer, crosslinkers, pH control, surfactants, breakers, etc., except for the proppant. Due to the geometry of most common measuring devices, proppant interferes with the measurement. Fracturing fluid viscosity is routinely measured without proppants included.

The present inventions are useful as a method for treating a well. In general, a method is provided for treating at least a portion of a well. The method includes the steps of: (a) simultaneously introducing into a mixer at least: (i) a first stream comprising water; (ii) a second stream comprising a dry, hydratable, viscosity-increasing agent for water, wherein the second stream is substantially free of water; and (iii) a third stream comprising a non-hydratable, insoluble particulate; (b) mixing the first, second, and third streams in the mixer to form a pumpable mixture, wherein: (i) the mixer creates at least a sufficiently-high shear rate to disperse the viscosity-increasing agent and the insoluble particulate in the pumpable mixture; and (ii) the pumpable mixture has or is capable of developing a substantially-higher viscosity than the viscosity of the first stream; and (c) introducing a treatment fluid comprising the pumpable mixture into a wellbore. Preferably, at least the first and second streams are not mixed prior to being introduced into the mixer.

As used herein, each of the words "comprise," "has," and "include" and all grammatical variations thereof are intended to have an open, non-limiting meaning that do not exclude additional elements or steps. It should also be understood that, as used herein, "first," "second," and "third," are arbitrarily assigned and are merely intended to differentiate between two or more streams, fluids, etc., as the case may be, and do not indicate any sequence. Furthermore, it is to be understood that the mere use of the term "first" does not require that there be any "second," and the mere use of the word "second" does not require that there be any "third," etc.

FIG. 1 is a diagram of a method according to the inventions for treating a well, wherein three separate streams of water, viscosity-increasing agent, and insoluble particulate are introduced simultaneously into a mixer to form a pumpable mixture, which is directed to a well. More particularly, a source of water 110 is directed as a first stream 115 to a mixer 140, a source of a viscosity-increasing agent 120 is directed as a second stream 125 to the mixer 140, and a source of insoluble particulate 130 is directed as a third stream 135 to the mixer 140. The mixer 140 mixes the streams to produce a stream 165 of a pumpable mixture. A source of additives 150 optionally can be directed as a stream 156 to be added to the source of water 110, as a stream 154 to be introduced into the mixer 140, or as a stream 152 to be merged or blended with the stream 165 comprising the pumpable mixture. The stream 165 of the pumpable mixture is directed to a pump 160 for being pumped as at least part of a stream 175 of a treatment fluid to a wellbore of a well 170. Optionally, the source of water 110 is directed as a separate stream 182 to be merged or blended with the stream 165 of at least the pumpable mixture or as a separate stream 184 to be merged or blended with the stream 175 to further make up the treatment fluid.

Figure 2:
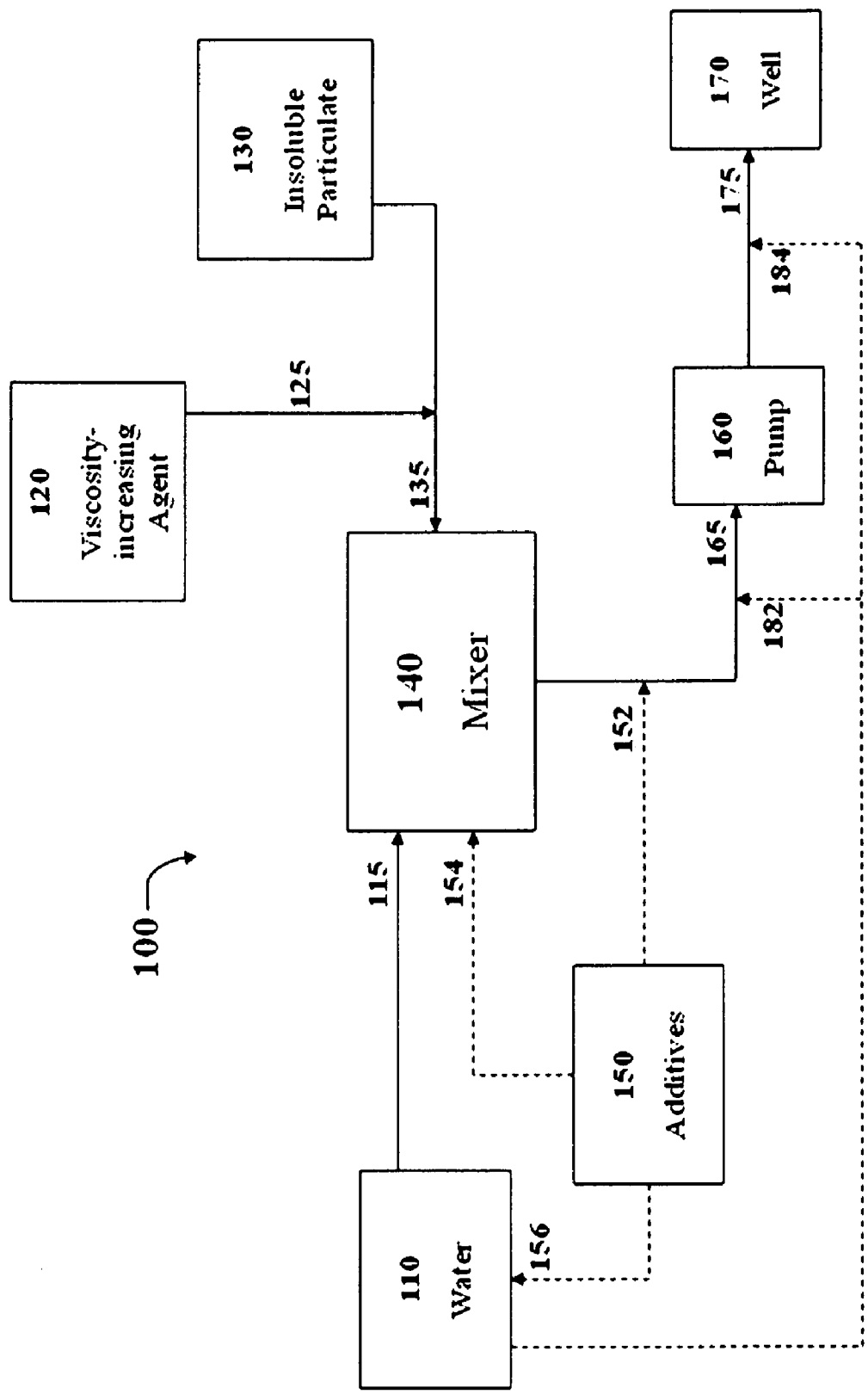
FIG. 2 is a diagram of a method according to the inventions for treating a well, wherein a stream of water and a combined stream of viscosity-increasing agent and insoluble particulate are simultaneously introduced into a mixer to form a pumpable mixture, which is directed to a well.

FIG. 2 is a diagram of a method according to the inventions for treating a well, wherein a stream of water and a combined stream of viscosity-increasing agent and insoluble particulate are introduced simultaneously into a mixer to form a pumpable mixture, which is directed to a well. The diagram of the method illustrated in FIG. 2 is similar to the diagram of the method illustrated in FIG. 1, except that the second stream 125 of the viscosity-increasing agent and the third stream 135 of the insoluble particulate are merged or blended prior to being introduced into the mixer 140.

The mixer can be any type of mixer apparatus that has at least a sufficiently-high shear rate to disperse the viscosity-increasing agent and the insoluble particulate in a fluid to form a pumpable mixture. A high shear mixer is often used to disperse a liquid, solid or gas, into a main continuous liquid phase where the liquid, solid or gas normally would be immiscible. The mixer is preferably capable of entraining, i.e., drawing in and transporting the solid particles by the flow of the continuous liquid phase, as measured by the mixer's shear rate. More preferably, the mixer has a shear rate of at least 50 V/g, where V is the tip speed measured in meters/second (m/s), and g is the gap between a rotor and stator.

In a preferred embodiment, the mixer apparatus employed in the inventions is an impeller mixer. An impeller mixer is capable of drawing in and dispersing the solid particles through the input of energy via a suitable prime mover and rotating impeller blades. In a preferred embodiment, the impeller within the housing of the impeller mixer has a plurality of impeller blades extending radially outward from a hub. The impeller blades rotate about the hub, thereby creating a centrifugal flow. The energy that creates the high-shear rate is provided by the motive force of the moving impellers of the mixer, which contact and move the three streams to create a vortex. The impeller mixer can either be an open-top or closed-top system.

The mixer preferably has at least one metered feeding device for regulating the flow rate of a stream of particulate into the mixer.

The mixer preferably has at least one valve for regulating the flow rate of a fluid stream into the mixer.

Figure 3:
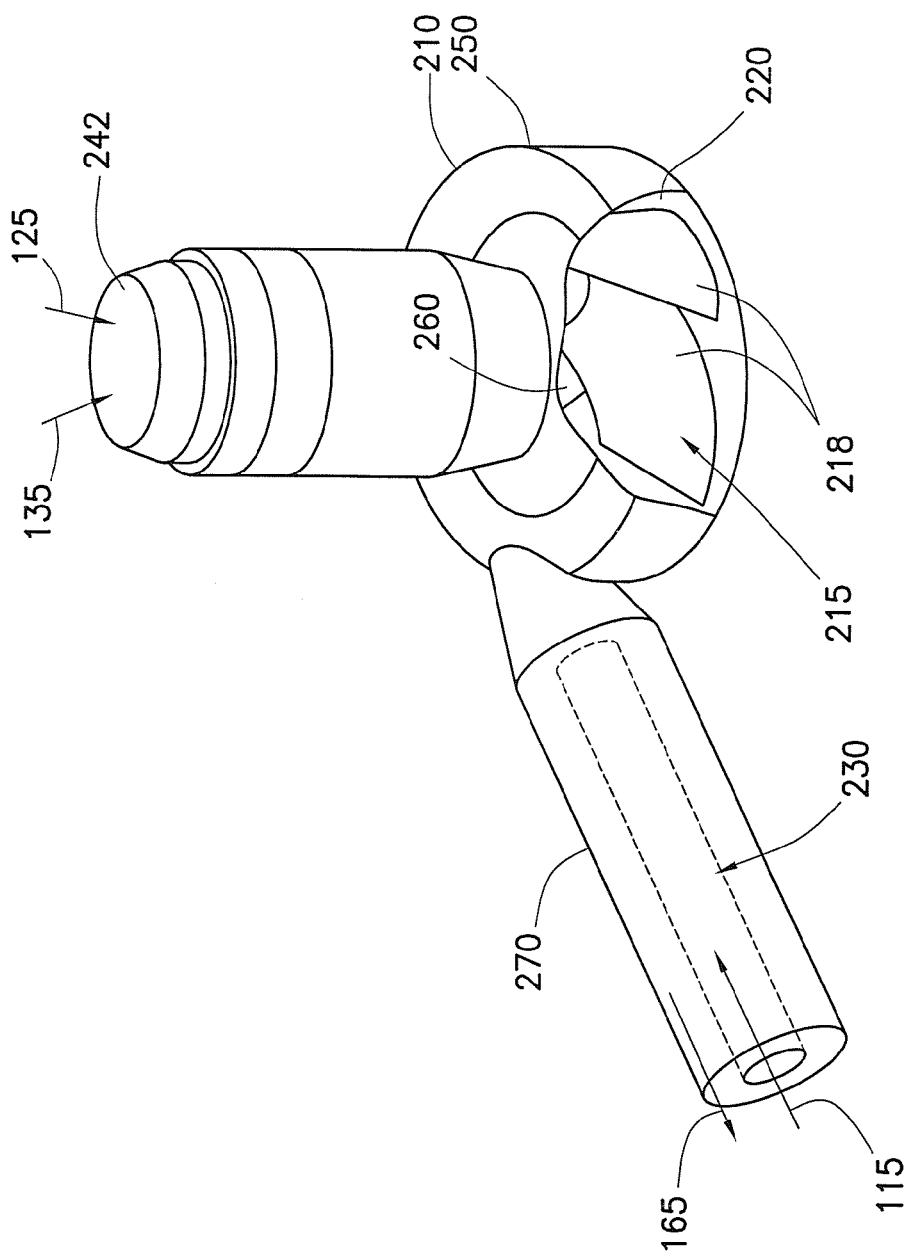
FIG. 3 is an orthogonal view of a preferred embodiment of an apparatus that can be used in a method according to for treating a well according to the inventions.

FIG. 3 is a side view of a presently-preferred embodiment of an impeller mixer 250 that can be used in a method for treating a well according to the inventions. The impeller mixer 250 includes a housing 210 having an inner chamber 220. The mixer employs an impeller 215 rotating on a hub 260 that spins on an axis, such as in a centrifugal pump, creating a centrifugal motion. In this embodiment, the impeller 215 has a plurality of impeller blades 218. The stream 115 of base fluid containing water is supplied to the mixer 250 by a fluid inlet 230. The stream 125 of viscosity-increasing agent in powdered gel form and the stream 135 of insoluble particulate are added through an inlet 242. The mixer 250 efficiently mixes the stream 125 of viscosity-increasing agent in powdered gel form, the stream 115 of base fluid containing water, and the stream 135 of insoluble particulate, to create the stream 165 of a pumpable mixture that is directed from the mixer 250 through outlet 270.

Figure 4:
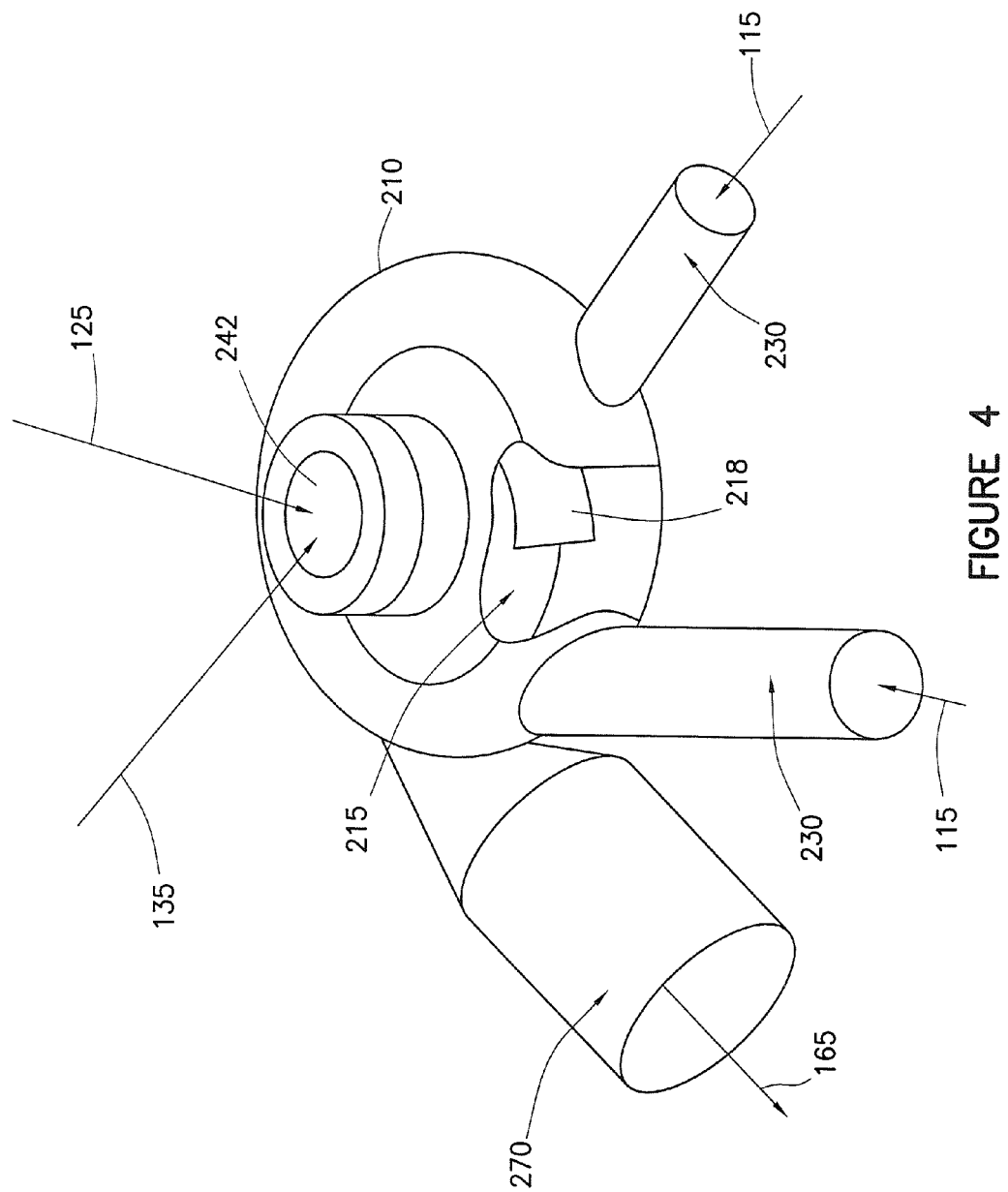
FIG. 4 is a side view of a presently-preferred embodiment of an impeller that can be used in a method for treating a well according to the inventions.
Figure 5:
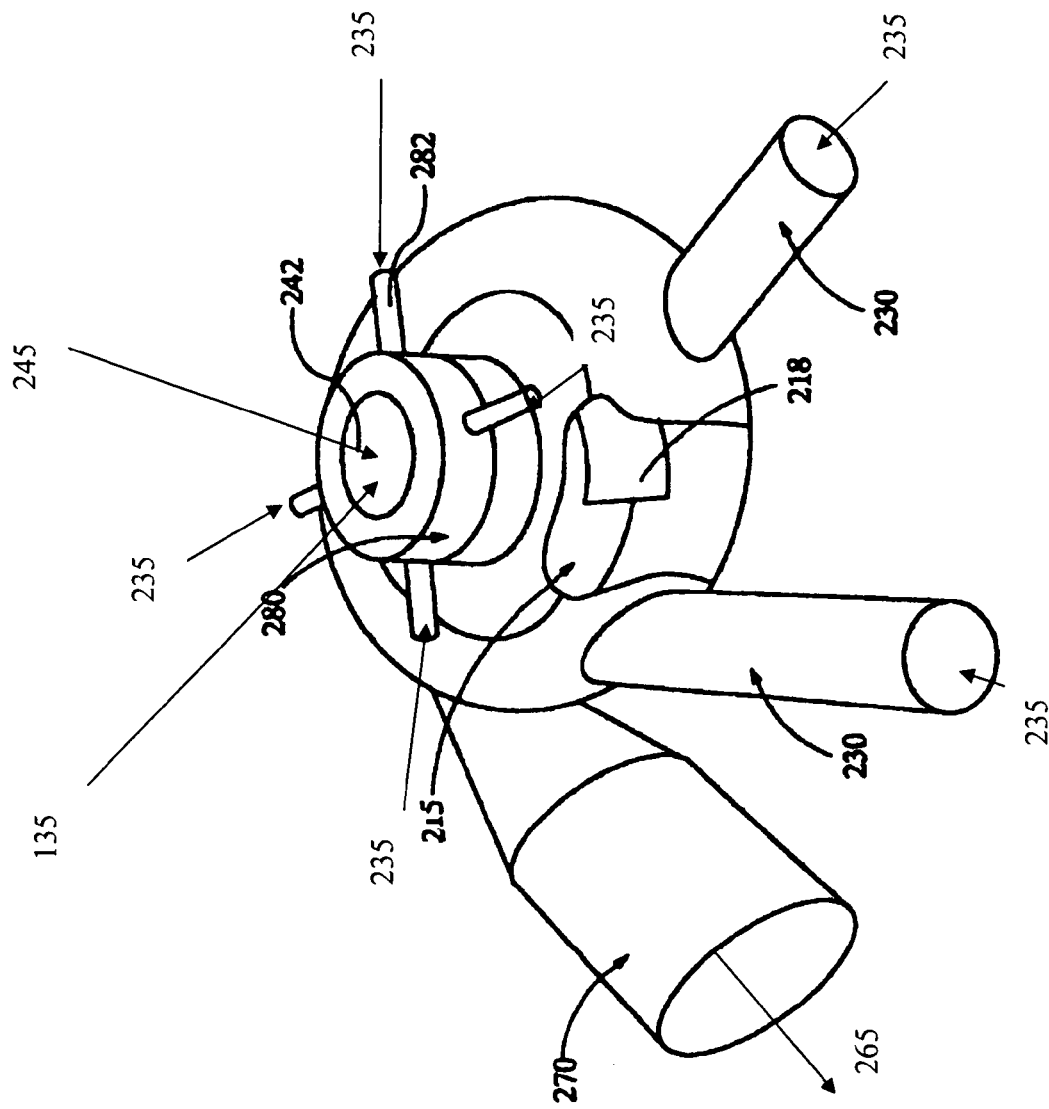
FIG. 5 is a side view of another presently-preferred embodiment of an impeller that can be used in a method for treating a well according to the inventions.

Another preferred embodiment of an impeller mixer 250 is illustrated in FIG. 5, which is similar to the mixer shown in FIG. 4 except that the arrangement of the fluid inlets 230 is different.

Such an impeller mixing system 200 and impeller mixers 250 are more fully disclosed in U.S. Pat. No. 7,048,432, issued May 23, 2006, having for named inventors Max Phillippi and Billy Slabaugh, which is incorporated herein by reference in its entirety.

In yet another embodiment, the three streams 115, 125, and 135 can be combined simultaneously in "J-Series"® impeller pumps currently available from Gorman-Rupp Pumps, of Mansfield, Ohio. Such pumps are designed for pumping fluids containing solids. In yet another embodiment, the streams can be combined simultaneously in a blending system where the mixer is a positive displacement pump capable of accepting a first stream of a fluid containing water, and second stream comprising a viscosity-increasing agent, and a third stream comprising a particulate. The positive displacement pump mixes the streams to form a pumpable mixture, which is then injected into a pressurized stream for blending with an additional proportion of the base fluid to form a treatment fluid.

Referring back to FIGS. 1 and 2, the three streams 115, 125, and 135 to the mixer 140 can be arranged in a variety of ways for simultaneously introducing the three streams into the mixer. A mixing system can be arranged in any fashion which is suitable for the needs of a given treatment operation which allows for the simultaneous introduction of the streams into the inner chamber. Preferably, the first stream 115 and second stream 125 are not mixed prior to being introduced into the mixer 140.

In the step of mixing, at least the three streams 115, 125, and 135 are mixed in the mixer 140 to form a stream 165 of a pumpable mixture. The mixing shear rate is high enough to disperse the viscosity-increasing agent and the insoluble particulate in the stream 165 of the pumpable mixture. In a preferred embodiment, the mixing shear rate is at least 50 V/g.

In the step of simultaneously introducing, the first stream 115 that is or includes water is a fluid. For example, the first stream 115 can be aqueous. The first stream 115 can have a continuous liquid phase of water at a temperature of 77° F. and a pressure of 1 atmosphere.

When the first stream 115 is introduced into the mixer, the first stream 115 preferably has an insufficient viscosity to entrain the insoluble particulate. More particularly, the first stream 115 would be incapable of suspending and transporting the desired concentration of the insoluble particulate through surface piping and through a wellbore to the portion of the well to be treated. For example, the first stream 115 preferably has a viscosity of less than 3 cP.

Preferably, the first stream 115 contains a lower concentration of the insoluble particulate than would interfere with fluid handling of the first stream. More preferably, the first stream 115 is substantially free of any insoluble particulate. Regarding the insoluble particulate, the term "substantially free" means containing less than 0.01% w/w of the insoluble particulate.

Preferably, the first stream 115 contains a lower concentration of the viscosity-increasing agent than would cause the first stream to have or to be capable of developing a viscosity of greater than 3 cP. More preferably, the first stream 115 is substantially free of hydrated hydratable viscosity-increasing agent. As used herein, "hydrated" means hydrated to the point the viscosity-increasing agent is not considered to be dry. More preferably, the first stream 115 is substantially free of any hydratable viscosity-increasing agent, regardless of the degree of hydration. Regarding the viscosity-increasing agent, the term "substantially free" means containing less than 0.01% w/w of the hydratable viscosity-increasing agent.

The second stream 125 is or includes a dry, hydratable viscosity-increasing agent for water.

The hydratable viscosity-increasing agent can be selected from the group consisting of guar, hydroxypropyl guar (HPG), carboxymethyl hydroxypropyl guar (CMHPG), CMG, hydroxyethyl cellulose (HEC), carboxymethyl cellulose (CMC), carboxymethyl hydroxyethyl cellulose (CM-HEC), xanthan, acrylamide or acrylate co-polymers, sulfonated polymers, phosphonated polymers, diutan, chitin, and any combination thereof in any proportion. Preferably, the viscosity-increasing agent is capable of becoming at least 80% hydrated in two minutes or less when mixed with water at a temperature of 77° F. As used herein, viscosity-increasing agents that are capable of being hydrated to at least 80% within two minutes or less are considered to be fast hydrating gels. Examples of fast-hydrating gels may include, but are not limited to, guar, HPG, CMHPG, CMG, HEC, CMC, CMHEC, xanthan, acrylamide co-polymers, acrylate co-polymers, sulfonated polymers, phosphonated polymers, diutan, and chitin. In a preferred embodiment, the viscosity-increasing agent can be selected from the group consisting of guar, HPG, CMHPG, CMG, and xanthan, acrylamide co-polymers, and any combination thereof in any proportion. More preferably, the viscosity-increasing agent is capable of building sufficient viscosity within the surface pipe time to keep the insoluble particulate in suspension between the step of mixing and the step of introducing a treatment fluid into a wellbore.

The hydratable viscosity-increasing agent is "dry" or substantially unhydrated prior to introducing it into the mixer 140. As used herein with respect to the hydratable viscosity-increasing agent, "dry" or "substantially unhydrated" means that the hydratable viscosity-increasing agent is hydrated less than would interfere with the viscosity-increasing agent being handled in powder form with powder material handling equipment. More preferably, the viscosity-increasing agent is 15% or less hydrated prior to introducing it into the mixer.

The second stream 125 is substantially free of water, which means that the second stream 125 contains less water that would be available or become available to hydrate the viscosity-increasing agent beyond being dry. For example, water that is chemically bound or otherwise trapped is not considered to be available to hydrate the viscosity-increasing agent.

In a preferred embodiment, the viscosity-increasing agent can be in particulate form, such as a powder. Preferably, the particle size distribution is at least 95% in the range of less than 200 mesh. More preferably, the second stream 125 can be a stream of the viscosity-increasing agent in particulate form. In another embodiment, the viscosity-increasing agent can be suspended in a non-aqueous liquid.

The third stream 135 includes a non-hydratable, insoluble particulate. More particularly, the insoluble particulate is insoluble in water and insoluble in oil. Preferably, the insoluble particulate is resistant to acids and oxidizers. Preferably, the third stream 135 has less fluid than would interfere with the material handling of the insoluble particulate in particulate-handling equipment. Preferably, at least 95% of the insoluble particulate has a particulate size in the range of 0.0625 mm to 2 mm. If the particulate material is to be used as a proppant, it should have a sufficient strength to prop a fracture open and to allow fluid flow through a pack of particulate material in the fracture. If the insoluble particulate is for gravel packing, its compressive strength or crush resistance is much less critical.

More preferably, the insoluble particulate is a proppant for use in hydraulic fracturing or a gravel for use in gravel packing. Typical examples of insoluble particulates include, but are not limited to, sand (silica), resin-coated sand, walnut shells, sintered bauxite, glass beads, plastics, nylons, resins, other synthetic materials, and ceramic materials.

As described herein, the methods according to the inventions optionally can include mixing additives 150 to form a stream 165 of the pumpable mixture or a stream 175 of the treatment fluid. Additives can be mixed in with other streams at various stages of the method. Typical additives include, but are not limited to, breakers, surfactants, cross-linking agents, fibers, breaker aids, co-surfactants, oxygen scavengers, alcohols, scale inhibitors, corrosion inhibitors, fluid-loss additives, oxidizers, bactericides, biocides and any combinations thereof.

Design criteria for a treatment fluid typically specifies, among other things, that the treatment fluid have a sufficient viscosity to satisfy the requirement of the well treatment design before a frac fluid break, otherwise the proppant or gravel is likely to screenout prematurely.

The pumpable mixture has or is adapted to be capable of developing a substantially-higher viscosity than the viscosity of the first stream 115. As used herein, "substantially-higher viscosity" means that the developed viscosity will be at least 100% higher or at least 5 cP higher, whichever is greater, than the viscosity of the first stream 115. More preferably, the pumpable mixture has or is capable of developing at least a sufficient viscosity that indicates the treatment fluid comprising the pumpable mixture is expected to be capable of suspending and transporting the insoluble particulate to the portion of the well to be treated. After achieving the substantially-higher viscosity, the viscosity of the treatment fluid optionally can be adapted to break. More preferably, the treatment fluid optionally can be adapted to break after achieving the maximum viscosity it is capable of ultimately developing.

The pumpable mixture is preferably water based. The pumpable mixture preferably has at least one liquid phase, when the pumpable mixture is tested at a temperature of 77° F. and a pressure of 1 atmosphere. More preferably, the pumpable mixture has a continuous liquid phase comprising water, when tested at a temperature of 77° F. and a pressure of 1 atmosphere.

Preferably, the pumpable mixture contains the hydratable, viscosity-increasing agent in a concentration in the range of 0.1% to 10% by weight in the continuous liquid phase. In yet another more-preferred embodiment, the pumpable mixture contains a sufficient concentration of water to fully hydrate the viscosity-increasing agent.

Preferably, the pumpable mixture contains the insoluble particulate in the range of 0.01 kilograms to about 3 kilograms of insoluble particulate added per liter of liquid phase (0.1-25 lb/gal).

Optionally, for example, a stream 152 of additives 150 can be combined with the stream 165 of the pumpable mixture. Typical additives include, but are not limited to, breakers, surfactants, cross-linking agents, fibers, breaker aids, co-surfactants, oxygen scavengers, alcohols, scale inhibitors, corrosion inhibitors, fluid-loss additives, oxidizers, bactericides, biocides, microemulsions, and any combination thereof.

Optionally, for example, a stream 182 or 184 including water can be added to the stream 165 of the pumpable mixture, before or after pumping with pump 160, to help form a stream 175 of a treatment fluid.

A stream 175 of a treatment fluid including at least the pumpable mixture is introduced into the wellbore of a well 170. Preferably, the treatment fluid is pumped through a pump 160 into the wellbore of the well 170. Preferably, the viscosity-increasing agent in the stream 175 of the treatment fluid is at least 80% hydrated upon introducing the treatment fluid into the wellbore of the well 170. More preferably, the viscosity-increasing agent in the stream 175 of the treatment fluid is at least 80% hydrated upon introduction into the wellbore of the well 170. Most preferably, the viscosity-increasing agent in the stream 175 of the treatment fluid is at least 95% hydrated upon introduction into the wellbore of the well 170. In a preferred embodiment, the treatment fluid is pumped through the pump 160 in a manner to preserve the insoluble particulate in a suspension until the treatment fluid reaches the portion of the well to be treated. For example, the pumpable mixture is preferably not stored in a stationary state between the time of exiting the mixer 140 and reaching the portion of the well 170. Most preferably, the average bulk velocity of the stream 165 of the pumpable mixture and the stream 175 of a treatment fluid including the pumpable mixture is at least 1 ft/sec between the time of exiting the mixer 140 and reaching the portion of the well 170 to be treated.

It is to be understood that numerous modifications, alterations, and changes can be made in the inventions without departing from the spirit and scope of the inventions as set forth in the appended claims. It is the intention to cover all embodiments and forms of the inventions within the allowable scope of the claims.

What is claimed is:

1. A method for treating at least a portion of a well, the method comprising the steps of:

a) simultaneously introducing into an impeller mixer at least:

i) a first stream comprising water;

ii) a second stream comprising a dry, hydratable, viscosity-increasing agent for water, wherein the second stream is substantially free of water; and iii) a third stream comprising a non-hydratable, insoluble particulate;

b) mixing the first, second, and third streams in the impeller mixer to form a pumpable mixture, wherein:

i) the impeller mixer creates at least a sufficiently-high shear rate to disperse the viscosity-increasing agent and the insoluble particulate in the pumpable mixture; and ii) the pumpable mixture has or is capable of developing a substantially-higher viscosity than the viscosity of the first stream; and c) introducing a treatment fluid comprising the pumpable mixture into a wellbore;

wherein the impeller mixer comprises:

a) a housing defining an inner chamber;

b) a first inlet connected to the housing and capable of directing the first stream into the inner chamber of the housing;

c) a second inlet connected to the housing and capable of directing the second stream into the inner chamber of the housing;

d) an outlet connected to the housing and capable of directing the pumpable mixture away from the housing; and e) an impeller within the housing.

2. The method according to claim 1, wherein the impeller mixer further comprises a third inlet connected to the housing and capable of directing the third stream into the inner chamber.

3. The method according to claim 1, wherein the first stream has an insufficient viscosity to entrain the insoluble particulate.

4. The method according to claim 1, wherein the first stream is substantially free of any hydrated hydratable viscosity-increasing agent.

5. The method according to claim 4, wherein the first stream is substantially free of any hydratable viscosity-increasing agent.

6. The method according to claim 4, wherein the viscosity-increasing agent is in particulate form.

7. The method according to claim 1, wherein the viscosity-increasing agent is capable of becoming at least 80% hydrated in two minutes or less when mixed with water at a temperature of 77° F.

8. The method according to claim 1, wherein the viscosity-increasing agent is capable of building sufficient viscosity within the surface pipe time to keep the insoluble particulate in suspension between the step of mixing and the step of introducing the treatment fluid into a wellbore.

9. The method according to claim 1, wherein the viscosity-increasing agent is substantially unhydrated prior to introducing the viscosity-increasing agent into the impeller mixer.

10. The method according to claim 1, wherein the third stream is free of any water that is capable of hydrating the viscosity-increasing agent in the second stream.

11. The method according to claim 1, wherein the insoluble particulate has a size in the range of 0.0625 mm to 2 mm.

12. The method according to claim 1, wherein the insoluble particulate is a proppant.

13. The method according to claim 1, wherein the shear rate is at least 50 V/g.

14. The method according to claim 1, wherein the pumpable mixture comprises a sufficient concentration of water to fully hydrate the viscosity-increasing agent.

15. The method according to claim 1, wherein the step of introducing a treatment fluid comprises pumping the pumpable mixture as a pumpable stream from the impeller mixer into the wellbore.

16. The method according to claim 1, wherein the viscosity-increasing agent in the treatment fluid is at least 50% hydrated upon the step of introducing the treatment fluid into the wellbore.

17. The method according to claim 1, wherein the viscosity-increasing agent in the treatment fluid is at least 80% hydrated upon the step of introducing the treatment fluid into the wellbore.

18. The method according to claim 1, wherein the step of introducing a treatment fluid comprises the step of preserving the insoluble particulate in a suspension until the pumpable mixture reaches the portion of the well to be treated.

19. A method for treating at least a portion of a well, the method comprising the steps of:
 a) simultaneously introducing into an impeller mixer at least:
  i) a first stream comprising water;
  ii) a second stream comprising a dry, hydratable, viscosity-increasing agent for water, wherein: the second stream is substantially free of water; and the viscosity-increasing agent is capable of becoming at least 80% hydrated in two minutes or less at a temperature of 77° F.; and
  iii) a third stream comprising a non-hydratable, insoluble particulate;
 b) mixing the first, second, and third streams in the impeller mixer to form a pumpable mixture, wherein:
  i) the impeller mixer creates at least a sufficiently-high shear rate to disperse the viscosity-increasing agent and the insoluble particulate in the pumpable mixture; and
  ii) the pumpable mixture has or is capable of developing a substantially-higher viscosity than the viscosity of the first stream; and
 b) introducing a treatment fluid comprising the pumpable mixture into a wellbore, wherein the viscosity-increasing agent is at least 50% hydrated in surface piping before introduction into the wellbore;
wherein the impeller mixer comprises:
 a) a housing defining an inner chamber;
 b) a first inlet connected to the housing and capable of directing the first stream into the inner chamber of the housing;
 c) a second inlet connected to the housing and capable of directing the second stream into the inner chamber of the housing;
 d) an outlet connected to the housing and capable of directing the pumpable mixture away from the housing; and
 e) an impeller within the housing.

20. The method according to claim 19, wherein at least the first and second streams are not mixed prior to being introduced into the impeller mixer, and the first stream has an insufficient viscosity to entrain the insoluble particulate.

21. A method for treating at least a portion of a well, the method comprising the steps of:
 a) simultaneously introducing into an impeller mixer at least:
  i) a first stream comprising water;
  ii) a second stream comprising a dry, hydratable, viscosity-increasing agent for water, wherein: the second stream is substantially free of water; and the viscosity-increasing agent is capable of becoming at least 80% hydrated in two minutes or less at a temperature of 77° F.; and
  iii) a third stream comprising a non-hydratable, insoluble particulate;
   wherein at least the first and second streams are not mixed prior to being introduced into the impeller mixer; and the first stream has an insufficient viscosity to entrain the insoluble particulate;
 b) mixing the first, second, and third streams in the impeller mixer to form a pumpable mixture, wherein:
  i) the impeller mixer creates at least a sufficiently-high shear rate to disperse the viscosity-increasing agent and the insoluble particulate in the pumpable mixture;
  ii) the pumpable mixture has or is capable of developing a substantially-higher viscosity than the viscosity of the first stream; and
 c) introducing a treatment fluid comprising the pumpable mixture into a wellbore, wherein the insoluble particulate is preserved in a suspension until the treatment fluid reaches the portion of the well to be treated;
wherein the impeller mixer comprises:
 a) a housing defining an inner chamber;
 b) a first inlet connected to the housing and capable of directing the first stream into the inner chamber of the housing;
 c) a second inlet connected to the housing and capable of directing the second stream into the inner chamber of the housing;
 d) an outlet connected to the housing and capable of directing the pumpable mixture away from the housing; and
 e) an impeller within the housing.

* * * * *